United States Patent
Dang et al.

(10) Patent No.: US 12,400,143 B2
(45) Date of Patent: Aug. 26, 2025

(54) MODEL DEVELOPMENT TOOL TO TRAIN, EVALUATE AND PREDICT WITH DEEP LEARNING BY SELECTING FUNCTIONS

(71) Applicant: Beijing Baidu Netcom Science Technology Co., Ltd., Beijing (CN)

(72) Inventors: Qingqing Dang, Beijing (CN); Kaipeng Deng, Beijing (CN); Lielin Jiang, Beijing (CN); Sheng Guo, Beijing (CN); Xiaoguang Hu, Beijing (CN); Chunyu Zhang, Beijing (CN); Yanjun Ma, Beijing (CN); Tian Wu, Beijing (CN); Haifeng Wang, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 996 days.

(21) Appl. No.: 17/480,292

(22) Filed: Sep. 21, 2021

(65) Prior Publication Data
US 2022/0004930 A1    Jan. 6, 2022

(30) Foreign Application Priority Data
Nov. 10, 2020    (CN) .......................... 202011247471.4

(51) Int. Cl.
*G06N 20/00*    (2019.01)
*G06F 18/21*    (2023.01)
*G06F 18/23*    (2023.01)

(52) U.S. Cl.
CPC ........... *G06N 20/00* (2019.01); *G06F 18/217* (2023.01); *G06F 18/23* (2023.01)

(58) Field of Classification Search
CPC . G06N 20/00; G06N 3/08; G06N 3/04; G06F 18/217; G06F 18/23
See application file for complete search history.

(56) References Cited

U.S. PATENT DOCUMENTS 9,367,428 B2    6/2016    Rhee et al.
2015/0106794 A1    4/2015    Rhee et al.
(Continued)

FOREIGN PATENT DOCUMENTS

CN    107392307 A    11/2017
CN    108021395 A    5/2018
(Continued)

OTHER PUBLICATIONS

"Ryan et al. Plan-Structured Deep Neural Network Models for Query Performance Prediction, 2019" (Year: 2019).*
(Continued)

*Primary Examiner* — Kamran Afshar
*Assistant Examiner* — Brian J Hales
(74) *Attorney, Agent, or Firm* — Keating & Bennett, LLP (57) ABSTRACT

Embodiments of the present disclosure provide a method and apparatus of training a model, an electronic device, a storage medium and a development system, which relate to a field of deep learning. The method may include calling a training preparation component to set at least a loss function and an optimization function for training the model, in response to determining that a training preparation instruction is received. The method further includes calling a training component to set a first data reading component, in response to determining that a training instruction is received. The first data reading component is configured to load a training data set for training the model. In addition, the method may further include training the model based on the training data set from the first data reading component, by using the loss function and the optimization function through the training component.

13 Claims, 4 Drawing Sheets

(56) References Cited

U.S. PATENT DOCUMENTS

| | | | |
|---|---|---|---|
| 2017/0061329 | A1 | 3/2017 | Kobayashi et al. |
| 2019/0095790 | A1 | 3/2019 | Ling et al. |
| 2019/0228495 | A1* | 7/2019 | Tremblay ............... B25J 9/1661 |
| 2020/0085382 | A1 | 3/2020 | Taerum et al. |
| 2020/0367074 | A1* | 11/2020 | Zhang .................... G06F 9/542 |
| 2022/0164703 | A1 | 5/2022 | Tezuka et al. |

FOREIGN PATENT DOCUMENTS

| | | |
|---|---|---|
| CN | 110121180 A | 8/2019 |
| CN | 110135524 A | 8/2019 |
| CN | 111310934 A | 6/2020 |
| JP | 2016-533570 A | 10/2016 |
| JP | 2017-049677 A | 3/2017 |
| JP | 2019-061664 A | 4/2019 |
| JP | 2019-139468 A | 8/2019 |
| WO | 2020/203061 A1 | 10/2020 |

OTHER PUBLICATIONS

Official Communication issued in corresponding European Patent Application No. 21198055.2, mailed on Mar. 25, 2022.
Official Communication issued in corresponding Chinese Patent Application No. 202011247471.4, mailed on Jul. 21, 2021.

* cited by examiner

MODEL DEVELOPMENT TOOL TO TRAIN, EVALUATE AND PREDICT WITH DEEP LEARNING BY SELECTING FUNCTIONS

CROSS REFERENCE TO RELATED APPLICATION(S)

This application claims the priority of the Chinese patent application 202011247471.4 filed on Nov. 10, 2020, the content of which is hereby used for reference.

TECHNICAL FIELD

Embodiments of the present disclosure mainly relate to a field of deep learning, and in particular to a method and apparatus of training a model, an electronic device, a computer-readable storage medium, and a development system of training a model.

BACKGROUND

With a rapid development of artificial intelligence technology, deep learning technology has become a key technology in a field of artificial intelligence. Deep learning framework development system enables a developer to build, train or evaluate customized neural networks by using functional components provided in the system, so that the customized neural networks may be applied to natural language processing, image recognition, speech recognition, and so on. In order to facilitate development, a large number of application programming interfaces (APIs) are designed in the deep learning framework development system. For example, for a senior developer, the deep learning framework development system generally includes a low-level API that may be flexibly applied in implementation of a complex scene model, and for a junior developer, the deep learning framework development system generally includes a high-level API that follows a fixed pattern. However, a model construction of the high-level API is not completely consistent with that of the low-level API. This results in that a large amount of codes are needed if the low-level API needs to be applied in an application and a transformation of the high-level API, which raises the bar of system development.

SUMMARY

According to exemplary embodiments of the present disclosure, there is provided a solution for training a model.

In a first aspect of the present disclosure, there is provided a method of training a model, including: calling a training preparation component to set at least a loss function and an optimization function, in response to determining that a training preparation instruction is received, wherein the loss function and the optimization function are called to train the model; calling a training component to set a first data reading component, in response to determining that a training instruction is received, wherein the first data reading component is configured to load a training data set for training the model; and training the model based on the training data set from the first data reading component, by using the loss function and the optimization function through the training component.

In a second aspect of the present disclosure, there is provided an apparatus of training a model, including: a training preparation component calling module configured to call a training preparation component to set at least a loss function and an optimization function, in response to determining that a training preparation instruction is received, wherein the loss function and the optimization function are called to train the model; a training component calling module configured to call a training component to set a first data reading component, in response to determining that a training instruction is received, wherein the first data reading component is configured to load a training data set for training the model; and a training execution module configured to train the model based on the training data set from the first data reading component, by using the loss function and the optimization function through the training component.

In a third aspect of the present disclosure, there is provided a development system of training a model, including: a training preparation component configured to set at least a loss function and an optimization function in response to a training preparation instruction, wherein the loss function and the optimization function are called to train the model; and a training component configured to: set a first data reading component in response to a training instruction, wherein the first data reading component is configured to load a training data set for training the model; and train the model based on the training data set from the first data reading component, by using the loss function set and the optimization function set.

In a fourth aspect of the present disclosure, there is provided an electronic device, including: one or more processors; and a storage device for storing one or more programs, wherein the one or more programs, when executed by the one or more processors, cause the one or more processors to implement the method according to the first aspect of the present disclosure.

According to a fifth aspect of the present disclosure, there is provided a computer-readable storage medium having a computer program stored thereon, wherein the computer program, when executed by a processor, causes the processor to implement the method according to the first aspect of the present disclosure.

In a sixth aspect of the present disclosure, there is provided a computer program product containing computer program instructions, wherein the computer program instructions are executable by a processor to implement the method according to the first aspect of the present disclosure.

It should be understood that content described in this section is not intended to limit key or important features in the embodiments of the present disclosure, nor is it intended to limit the scope of the present disclosure. Other features of the present disclosure will be easily understood through the following description.

BRIEF DESCRIPTION OF THE DRAWINGS

The above and other features, advantages and aspects of the embodiments of the present disclosure will become more apparent in combination with the drawings and with reference to the following detailed description. In the drawings, same or similar reference numerals indicate same or similar elements.

DETAILED DESCRIPTION OF EMBODIMENTS

Hereinafter, embodiments of the present disclosure will be described in more detail with reference to the drawings. Although some embodiments of the present disclosure are shown in the drawings, it should be understood that the present disclosure may be implemented in various forms and should not be construed as being limited to the embodiments set forth herein. On the contrary, these embodiments are provided for a more thorough and complete understanding of the present disclosure. It should be understood that the drawings and the embodiments of the present disclosure are only used for exemplary purposes and are not used to limit the protection scope of the present disclosure.

In the description of the embodiments of the present disclosure, the term "including" and similar terms should be understood as open-ended inclusion, that is, "including but not limited to." The term "based on" should be understood as "at least partially based on." The term "an embodiment," "one embodiment" or "this embodiment" should be understood as "at least one embodiment." The terms "first," "second" and the like may refer to different or same objects.

The following may also include other explicit and implicit definitions.

As mentioned above, in order to improve a usability of a high-level API and reduce a code amount of algorithms implemented by the high-level API, it is necessary to provide an optimized development system of training a model as well as a method and apparatus of training a model based on the development system. In addition, in current mainstream methods of training a model, training data generally needs to be processed in parallel through a plurality of computing devices (that is, computing nodes dedicated to model training, such as CPU or GPU, etc.) so as to achieve parallel training. However, in a traditional high-level API, different codes need to be input separately to set a single computing device or a plurality of computing devices for processing data, which further increases the code amount. Therefore, in a design of the high-level API, this aspect needs to be taken into account to reduce the code amount.

According to the embodiments of the present disclosure, a model training solution is proposed. For example, in the design of the high-level API, a call path between a relevant component in the high-level API and that in the low-level API may be created, so that low-level API codes such as a loss function, a measurement function, an optimization function, etc., may be completely reused. After receiving a relevant instruction from a developer or other users, the development system may directly call a high-level API component associated with the instruction, and the high-level API component may automatically call the low-level API used to execute the instruction. In this way, compared with the traditional high-level API, the amount of codes that the developer needs to input is significantly reduced. Since the high-level API supports the user to define or select the low-level API such as the loss function and the measurement function, the high-level API in the present disclosure is more flexible and practical than the traditional high-level API.

In addition, the method of training the model in the present disclosure may also solve a problem of failure of parallel processing with a plurality of computing devices due to a lack of data to be processed on an individual computing device by automatically completing data and optionally setting a respective mask, and may solve a problem of automatic aggregation of an evaluation result by firstly aggregating data after parallel processing and then calculating the evaluation result.

Figure 1:
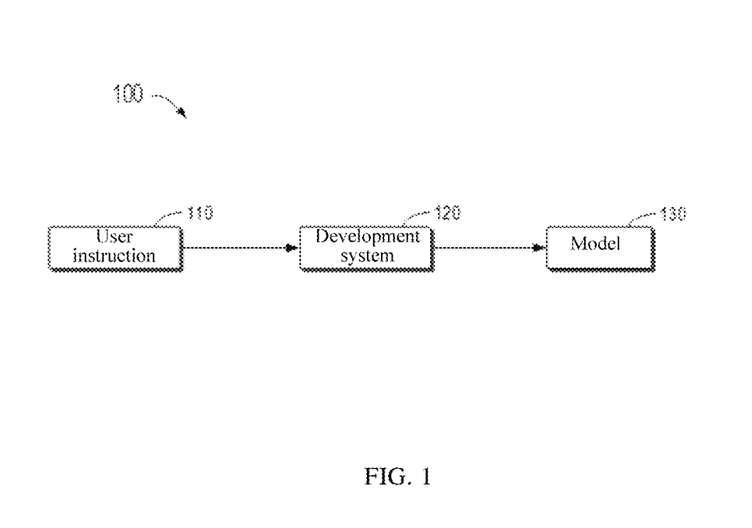
FIG. 1 shows a schematic diagram of an example environment in which various embodiments of the present disclosure may be implemented.

The embodiments of the present disclosure will be described in detail below with reference to the drawings. FIG. 1 shows a schematic diagram of an example environment 100 in which various embodiments of the present disclosure may be implemented. As shown in FIG. 1, the example environment 100 includes a user instruction 110 for training a model, a development system 120, and a model 130.

As shown in FIG. 1, the development system 120 is suspended until the user instruction 110 is input by the user. In some embodiments, the user instruction 110 is a code typed by the developer. Alternatively or additionally, the user instruction 110 may also be an instruction key for a junior developer or even a beginner. For example, when the beginner wants to select a specific function (for example, an optimization function) required for training the model, the beginner may select a training preparation component on an initial development interface, and select an optimization function, such as Adam optimizer, in a next level of the training preparation component. In some embodiments, the development system 120 may be located in, including but not limited to a personal computer, a server computer, a handheld or laptop device, a mobile device (such as a mobile phone, a personal digital assistant (PDA), a media player), a multiprocessor system, a consumer electronic product, a small computer, a large computer, a distributed computing environment including any one of the systems or devices described above, or the like.

When the development system 120 receives the user instruction 110 from the developer, the development system 120 may automatically call a components associated with the user instruction 110. As an example, the development system 120 may call a training preparation component to define relevant functions required to train the model 130. As another example, the development system 120 may call a training component to define a data reading component required to read the training data. Thus, the model may be automatically trained based on the training data selected and the relevant functions.

Figure 2:
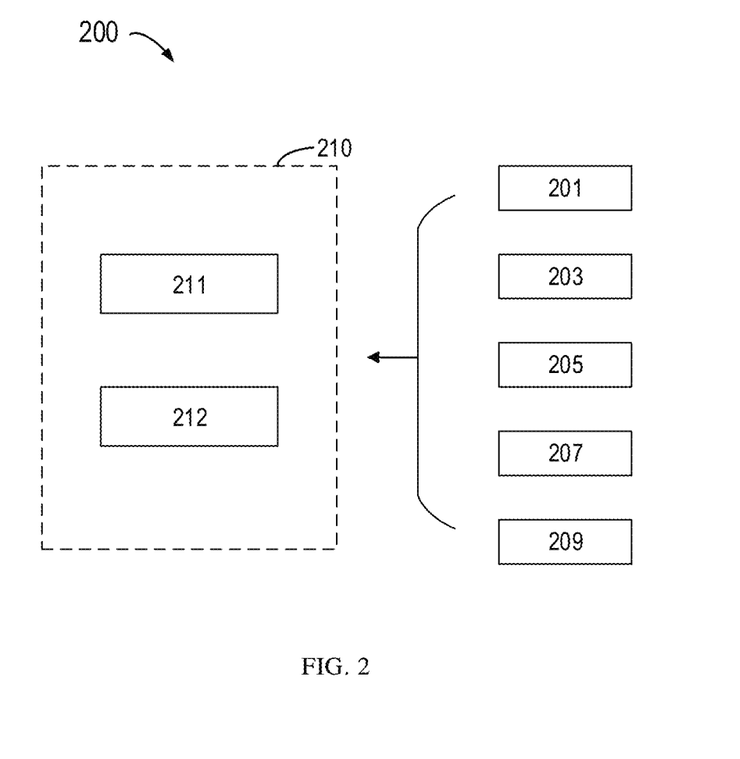
FIG. 2 shows a schematic diagram of a development system architecture for training a model according to the embodiments of the present disclosure.

FIG. 2 shows a schematic diagram of a development system 200 of training the model according to the embodiments of the present disclosure. As shown in FIG. 2, the development system 200 includes a high-level API 210. The high-level API 210 includes at least a training preparation component 211 and a training component 212. After receiving a training preparation instruction from the developer, the training preparation component 211 may set a loss function 201 and an optimization function 205 for training the model 130. It should be understood that the training preparation component 211 may be used to define the optimization function, the loss function, the measurement function, the training data set, etc. required for training the model 130. After receiving a training instruction from the developer, the training component 212 may set a data reading component 207 so as to load training data 209 for training the model 130

(that is, a training data set). That is to say, the training component 212 may be used to set a cycle iteration process, a number of training rounds and a process of reading the training data required for training the model 130. After relevant parameters for training are set, the training component 212 is configured to train the model 130 based on the training data 209 from the data reading component 207, by using the loss function 201 set and the optimization function 205 set.

In some embodiments, the training preparation component 211 may further set a measurement function 203, and the high-level API 210 may further include an evaluation component. The evaluation component (not shown) may set the data reading component 207 based on an evaluation instruction. The data reading component 207 is configured to load evaluation data different from the training data 209 (that is, an evaluation data set). That is to say, the evaluation component may evaluate the model 130 based on a difference between an output of the model 130 (that is, a prediction result) and a labeled result in the evaluation data set. For example, the evaluation component may evaluate the model 130 based on the evaluation data set from the data reading component 207, by using the model 130 trained, the loss function 201 and the measurement function 203.

In some embodiments, the high-level API 210 may further includes a prediction component used to set the data reading component 207 so as to load a prediction data set different from the training data 209. For example, the prediction component may determine a prediction result of the prediction data set from the data reading component 207 by using the model 130 trained.

As shown in FIG. 2, the development system 200 may include several low-level APIs, such as the loss function 201, the measurement function 203, the optimization function 205, the data reading component 207, and the training data 209. As an example, the loss function 201, the measurement function 203, the optimization function 205 and the data reading component 207 are all the low-level APIs in the development system of training the model. For example, the data reading component 207 may be used to read the training data 209 and input an input portion of the training data 209 to the model 103. An output of the model is the prediction result. The loss function 201 may be used to compare the prediction result with the labeled result in the training data 209 so as to obtain the difference. The optimization function 205 may be used to optimize the parameters of the model 103 so as to reduce the difference. The above process is repeated until the parameters of the model 103 converge.

It should be understood that the data reading component(s) 207 called by the components mentioned above may be a same data reading component used to perform different tasks at different times, or may be different data reading components. For example, when a user instruction for training is received, the data reading component 207 may retrieve the training data 209; when a user instruction for evaluation is received, the data reading component 207 may retrieve the evaluation data; and when a user instruction for prediction is received, the data reading component 207 may retrieve the prediction data.

The technical solutions described above are only for example, and do not limit the present disclosure. It should be understood that the entire development system 200 may also be arranged in other ways and connection relationships. In order to explain the principle of the above solutions more clearly, a process of training the model will be described below in more detail with reference to FIG. 3.

Figure 3:
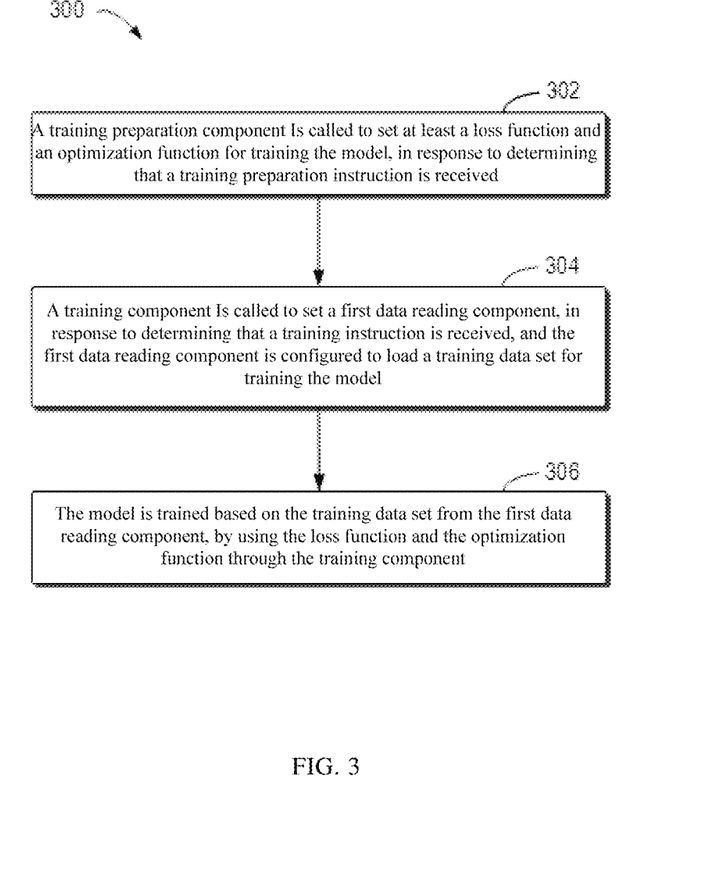
FIG. 3 shows a flowchart of a process of training a model according to the embodiments of the present disclosure.

FIG. 3 shows a flowchart of a process of training a model according to the embodiments of the present disclosure. In some embodiments, a method 300 may be implemented in the development system 120 shown in FIG. 1. A process 300 of training a model according to the embodiments of the present disclosure will be described below with reference to FIG. 3. For ease of understanding, specific data mentioned below are all exemplary and are not used to limit the protection scope of the present disclosure.

In order to more clearly introduce the solutions of the present disclosure, a dataset-based model training is illustrated with reference to FIG. 3 by way of example in describing a specific process of training the model. It should be understood that model training development solutions in the present disclosure are also applicable to other development system frameworks. After the developer sets a format of input training data and a network structure of the model to be trained, the process 300 of training the model begins.

In step 302, the development system 120 may detect in real time whether a user instruction is input or not. When it is determined that the user instruction 110 such as the training preparation instruction is received, the development system 120 automatically calls the training preparation component 211 to set at least the loss function 201 and the optimization function 205 for training the model 130. It should be understood that the "component" and "function" mentioned here are actually the application programming interface APIs mentioned above.

In step 304, the development system 120 may continue to detect whether a user instruction is input or not. When it is determined that the user instruction 110 such as the training instruction is received, the development system 120 automatically calls the training component 212 to set the data reading component 207. Here, the data reading component 207 is configured to load the training data 209 for training the model 130 (that is, the training data set). In some embodiments, the training component 212 may include a call path for the loss function 201, a call path for the optimization function 205, and a call path for the data reading component 207.

It should be understood that when the model 130 is trained based on the training data 209, due to a large amount of the training data 209, the training is usually performed by parallel processing with a plurality of computing devices, so as to reduce training time. However, when the training data 209 is allocated to the plurality of computing devices, there may be a lack of data to be processed on a certain computing device. For example, if the training data set contains 10 data, and four computing devices are used for parallel processing, there may be a problem of missing data on two computing devices, resulting in the failure of parallel training with the plurality of computing devices.

Figure 4:
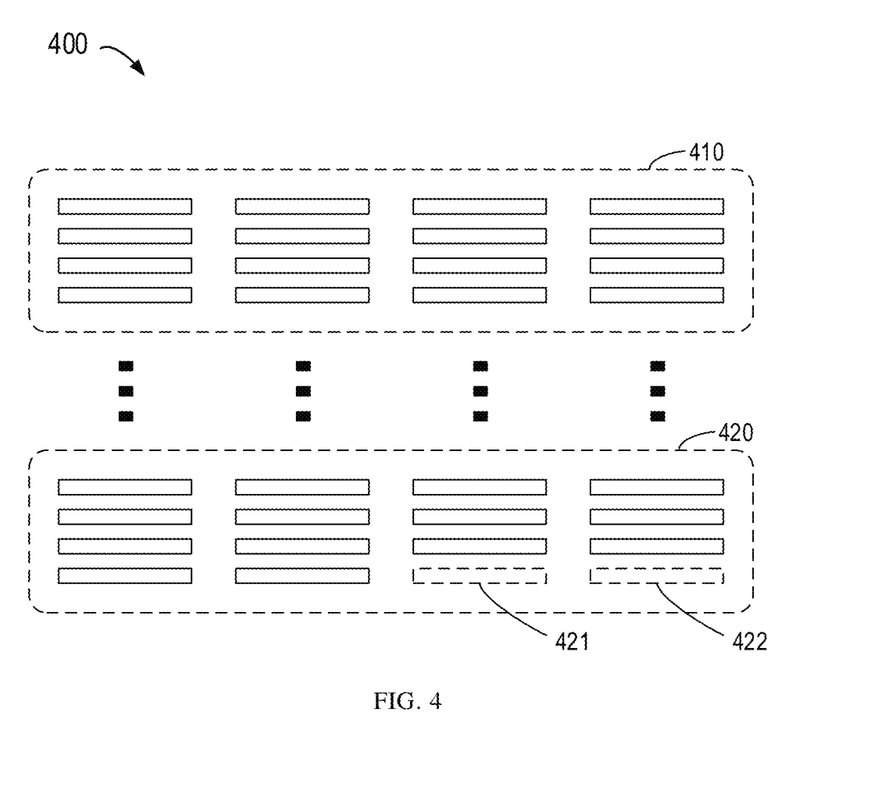
FIG. 4 shows a schematic diagram of data distribution in parallel training with a plurality of computing devices according to the embodiments of the present disclosure.

Therefore, the problem of missing data may be solved automatically through the following process. For a clear description, this process is described with reference to FIG. 4. FIG. 4 shows a schematic diagram of an interior of the data reading component 400 for data distribution in parallel training with a plurality of computing devices according to the embodiments of the present disclosure. As shown in FIG. 4, a large amount of training data 209 is loaded in the data reading component 400. The training data 209 contains at least a first batch 410 and a last batch 420 (intermediate batches are not shown). Each batch of training data 209 is divided into a plurality of groups to be loaded into the plurality of computing devices for parallel execution of, for example, the following training process.

Firstly, the development system 120 may acquire a number of the computing devices for the parallel processing of the training data 209, that is 4. It should be understood that the type and number of the computing devices may be set in the training preparation component 211, or the developer may directly enter codes to make a simple setting. Therefore, the development system 120 may then determine the number of the computing devices based on the setting. After that, the development system 120 may group the training data set based on the number, as shown in FIG. 4, so that the data in the training data set is arranged in the data reading component 207. Further, positions in the data reading component 207 where the training data is missing, that is, vacancy 421 and vacancy 422, may also be determined. Finally, the development system 120 may fill these positions with predetermined data. As an example, the development system 120 may fill the vacancy 421 and the vacancy 422 with any data in the training data set. For example, a first data in the data set may be copied and filled into the vacancy 421, and a second data in the data set may be copied and filled into the vacancy 422. With similar processing, the training data 209 may be input into the computing devices so as to train the model 130 in a subsequent process.

In step 306, the development system 120 may train the model 130 based on the training data 209 from the data reading component 207, by using the loss function 201 and the optimization function 205 through the training component 212. It should be understood that since the training component 212 includes the call path for the loss function 201, the call path for the optimization function 205 and the call path for the data reading component 207, the training component 212 may automatically call the data reading component 207 to read the training data 209. In addition, the input portion of the training data 209 is input to the model 103, and the output of the model 103 is the prediction result. Therefore, the training component 212 may automatically call the loss function 201 to compare the prediction result with the labeled result in the training data 209, so as to obtain the difference. Furthermore, based on the difference, the training component 212 may automatically call the optimization function 205 to optimize the parameters of the model 103. A two-layer loop program has been constructed in the training component 212 to perform the above process cyclically until the parameters of the model 103 converge or a predetermined number of iterations are reached. In this way, the present disclosure enables the developer to train the model flexibly only by inputting a few lines of code, which greatly saves developer's research and development costs.

A process of evaluating the model 130 will be described in detail below.

Similar to the process 302, the development system 120 may further automatically call the training preparation component 211, based on the user instruction 110 from the developer, to set the measurement function 203 for evaluating the model 130 (that is, a character segment about "evaluation" in the code input by the developer). In this way, the developer may select and set the functions required to evaluate the model 130 only by entering a few lines of code.

Similar to the process 304, the development system 120 may further automatically call the evaluation component, based on the user instruction 110 (here is the evaluation instruction) from the developer, to set the data reading component 207. Here, the data reading component 207 is configured to load the evaluation data different from the training data 209 (that is, the evaluation data set). The evaluation data set may be input to the model 130 to evaluate the model 130. In some embodiments, the training component may include a call path for the loss function 201, a call path for the measurement function 203, and a call path for the data reading component 207.

Similar to the process 306, the development system 120 may evaluate the model 130 based on the evaluation data set from the data reading component 207, by using the model 130 trained, the loss function 201 and the measurement function 203 through the evaluation component. For example, a recall rate and an accuracy rate of the model 130 may be calculated. In this way, the present disclosure enables the developer to evaluate the model flexibly only by inputting a few lines of code.

The process of automatically solving the problem of missing data is described above with reference to FIG. 4. It should be understood that this process is only for the training of the model. Because the training data set usually contains a large amount of data, the process of training the model may not have too high requirements on the training data. Therefore, the training data filled in the vacancies 421 and 422 may also be used to train the model 130. However, if the model 130 is evaluated by parallel execution with a plurality of computing devices, the training data filled in the vacancies 421 and 422 may affect the evaluation result. Therefore, this case may be automatically handled in the following way.

Firstly, the development system 120 may acquire a number of the computing devices for parallel processing of the evaluation data, that is 4, for example. Then, the development system 120 may group the evaluation data based on the number, as shown in FIG. 4, so that the data in the evaluation data set is arranged in the data reading component 207. Positions in the data reading component 207 where the evaluation data is missing, that is, vacancy 421 and vacancy 422, may also be determined. After that, the development system 120 may fill these positions with predetermined data. As an example, the development system 120 may fill the vacancies 421, 422 with any data in the evaluation data set. For example, a first data in the data set may be copied and filled into the vacancy 421, and a second data in the data set may be copied and filled into the vacancy 422. Thus, similar to the manner described above, each batch in the filled data set may be used for the parallel processing with the plurality of computing devices. That is, the evaluation result for the model 130 may be determined based on the filled evaluation data set by using the model 130 trained, the loss function 201 set and the measurement function 203 set.

For the evaluation result determined, the evaluation result of the evaluation data filled in the vacancies 421 and 422 is not expected. Therefore, the development system 120 may minimize a weight of an invalid evaluation result associated with the position where the evaluation data is missing in the evaluation result, so as to remove the invalid evaluation result. For example, the weight of the evaluation result associated with the position where the evaluation data is missing may be set to zero, and a weight of other positions may be set to one, so that the result is masked. In addition, the development system 120 may be further configured to automatically aggregate the evaluation result. For example, the development system 120 may call the training component to firstly aggregate the prediction result output from the model, and then calculate the evaluation result through the measurement function 203. Thus, the developer may aggregate the evaluation result without entering additional codes. In this way, either a processing with a single computing device or a parallel processing with a plurality of computing devices may be implemented in the development system 120 of the present disclosure, and the amount of input code is significantly reduced.

In addition, in some embodiments, in addition to functions of training and evaluation described above, the development system 120 may be further configured to predict the output of the model 130 based on the user instruction 110. For example, the development system 120 may call the prediction component to set the data reading component 207, after the prediction instruction is receiving. The data reading component 207 is configured to load the prediction data different from the training data 209. The prediction data here differs from the training data 209 and the evaluation data in that both the training data 209 and the evaluation data are labeled data (that is, both contain the input data entering the model 130 and the labeled result), while the prediction data is unlabeled data (that is, the prediction data only contains the input data entering the model 130). Then, the development system 120 may determine the prediction result of the prediction data set from the data reading component 207 by using the model 130 trained, through the prediction component. When the developer needs to view the prediction result of specific data or a group of data, a function of prediction may be realized conveniently only by inputting a few lines of code, which significantly saves research and development resources.

Through the embodiments described above, the solution of training the model, the solution of evaluating the model and the solution of predicting the model of the present disclosure may realize a reduction of the input of codes. Training a model based on the traditional high-level API generally needs tens of lines or even more codes. Compared with this, the solution of training the model, the solution of evaluating the model and the solution of predicting the model of the present disclosure only need a few lines of codes in total, so that the developer's research and development resources and time costs are significantly saved. In addition, in a case of the parallel training with a plurality of computing devices, the solutions of the embodiments of the present disclosure do not need to input additional codes, or the input codes are significantly reduced.

Figure 5:
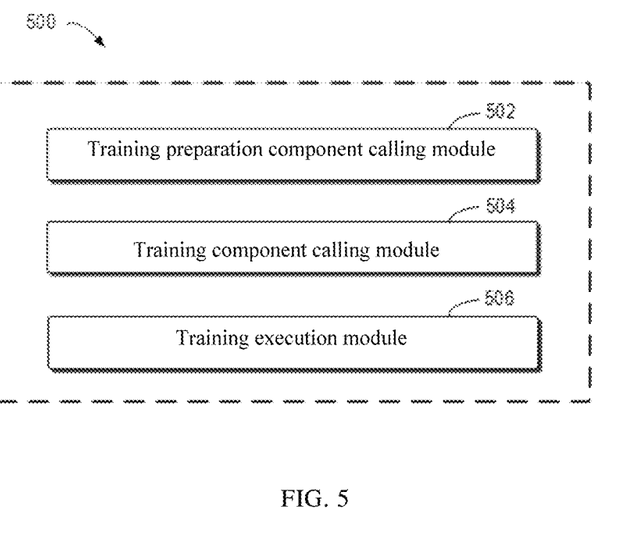
FIG. 5 shows a block diagram of an apparatus of training a model according to the embodiments of the present disclosure.

FIG. 5 shows a block diagram of an apparatus 500 of training a model according to the embodiments of the present disclosure. As shown in FIG. 5, the apparatus 500 may include a training preparation component calling module 502, a training component calling module 504, and a training execution module 506. The training preparation component calling module 502 is configured to call a training preparation component to set at least a loss function and an optimization function, in response to determining that a training preparation instruction is received. The loss function and the optimization function are called to train the model. The training component calling module 504 is configured to call a training component to set a first data reading component, in response to determining that a training instruction is received. The first data reading component is configured to load a training data set for training the model. The training execution module 506 is configured to train the model based on the training data set from the first data reading component, by using the loss function and the optimization function through the training component.

In some embodiments, the training preparation component calling module 502 may be further configured to call the training preparation component to set a measurement function. The apparatus 500 may further include an evaluation component calling module and an evaluation execution module. The evaluation component calling module is configured to call an evaluation component to set a second data reading component, in response to determining that an evaluation instruction is received. The second data reading component is configured to load an evaluation data set different from the training data set. The evaluation execution module is configured to evaluate the model based on the evaluation data set from the second data reading component, by using the model trained, the loss function and the measurement function through the evaluation component.

In some embodiments, the apparatus 500 may further include a prediction component calling module and a prediction result determination module. The prediction component calling module is configured to call a prediction component to set a third data reading component, in response to determining that a prediction instruction is received. The third data reading component is configured to load a prediction data set different from the training data set. The prediction result determination module is configured to determine a prediction result of the prediction data set from the third data reading component, by using the model trained through the prediction component.

In some embodiments, the apparatus 500 may further include a number acquisition module, a training data arrangement module, a position determination module, and a filling module. The number acquisition module is configured to acquire a number of computing devices for parallel processing of the training data set. The training data arrangement module is configured to group the training data set based on the number, so that training data in the training data set is arranged in the first data reading component. The position determination module is configured to determine a position in the first data reading component where the training data is missing. The filling module is configured to fill the position with predetermined data.

In some embodiments, the apparatus 500 may further include a number acquisition module, a training data arrangement module, a position determination module, and a filling module. The number acquisition module is configured to acquire a number of computing devices for parallel processing of the evaluation data set. The training data arrangement module is configured to group the evaluation data set based on the number, so that evaluation data in the evaluation data set is arranged in the second data reading component. The position determination module is configured to determine a position in the second data reading component where the evaluation data is missing. The filling module is configured to fill the position with predetermined data, so as to form a filled evaluation data set.

In some embodiments, the apparatus 500 may further include a prediction result determination module and a weight minimization module. The prediction result determination module is configured to determine an evaluation result for the model based on the filled evaluation data set, by using the model trained, the loss function set and the measurement function set. The weight minimization module is configured to minimize a weight of an invalid evaluation result in the evaluation result, so as to remove the invalid evaluation result. The invalid evaluation result is associated with the position where the evaluation data is missing.

In some embodiments, the training component includes a call path for the loss function, a call path for the optimization function and a call path for the first data reading component.

In some embodiments, the evaluation component includes a call path for the loss function, a call path for the measurement function and a call path for the second data reading component.

Figure 6:
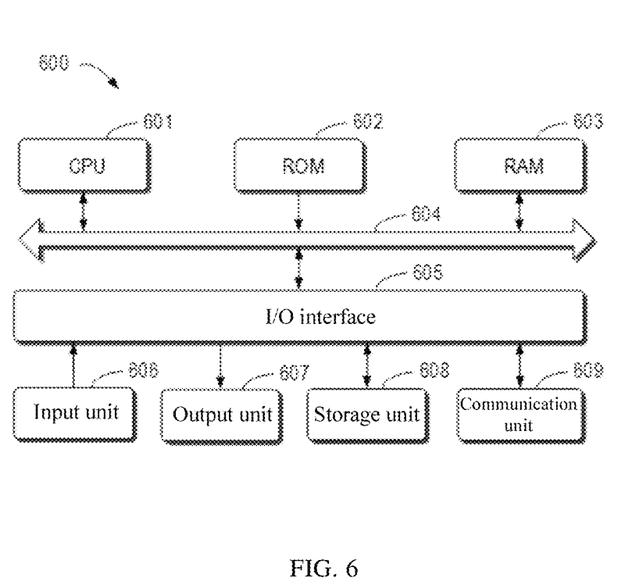
FIG. 6 shows a block diagram of a computing device for implementing the various embodiments of the present disclosure.

FIG. 6 shows a block diagram of a computing device 600 for implementing the various embodiments of the present disclosure. The computing device 600 may be used to implement the development system 120 in FIG. 1. As shown, the computing device 600 includes a central processing unit (CPU) 601, which may perform various appropriate actions and processing based on computer program instructions stored in a read-only memory (ROM) 602 or computer program instructions loaded from a storage unit 608 into a random access memory (RAM) 603. Various programs and data required for operations of the computing device 600 may also be stored in the RAM 603. The CPU 601, the ROM 402 and the RAM 603 are connected to each other through a bus 604. An input/output (I/O) interface 605 is also connected to the bus 604.

Various components in the computing device 600, including an input unit 606 such as a keyboard, a mouse, etc., an output unit 607 such as various types of displays, speakers, etc., a storage unit 608 such as a magnetic disk, an optical disk, etc., and a communication unit 609 such as a network card, a modem, a wireless communication transceiver, etc., are connected to the I/O interface 605. The communication unit 609 allows the computing device 600 to exchange information/data with other devices through a computer network such as the Internet and/or various telecommunication networks.

The processing unit 601 performs the various methods and processes described above, such as the process 300. For example, in some embodiments, the process 300 may be implemented as a computer software program that is tangibly contained on a machine-readable medium such as the storage unit 608. In some embodiments, part or all of a computer program may be loaded and/or installed on the computing device 600 via the ROM 602 and/or the communication unit 609. When the computer program is loaded into the RAM 603 and executed by the CPU 601, one or more steps of the process 300 described above may be performed. Alternatively, in other embodiments, the CPU 601 may be configured to perform the process 300 in any other appropriate way (for example, by means of firmware).

The functions described above may be performed at least partially by one or more hardware logic components. For example, without limitation, exemplary types of the hardware logic components that may be used include: field programmable gate array (FPGA), application specific integrated circuit (ASIC), application specific standard product (ASSP), system on chip (SOC), complex programmable logic device (CPLD), etc.

Program codes for implementing the method of the present disclosure may be written in a programming language or any combination of a plurality of programming languages. These program codes may be provided to a processor or a controller of a general-purpose computer, a special-purpose computer, or other programmable data processing devices, so that when the program codes are executed by the processor or the controller, the functions/operations specified in the flowchart and/or the block diagram may be implemented. The program codes may be executed completely on a machine, partly on the machine, partly on the machine and partly on a remote machine as an independent software package, or completely on the remote machine or a server.

In the context of the present disclosure, the machine readable medium may be a tangible medium that may contain or store programs for use by or in combination with an instruction execution system, device or apparatus. The machine-readable medium may be a machine-readable signal medium or a machine-readable storage medium. The machine-readable medium may include, but not be limited to an electronic, magnetic, optical, electromagnetic, infrared or semiconductor system, device or apparatus, or any suitable combination of the above. More specific examples of the machine-readable storage medium may include electrical a connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination of the above.

In addition, although the operations are described in a specific order, it should be understood that such operations are required to be performed in the specific order shown or in a sequential order, or that all the operations illustrated should be performed to achieve a desired result. Under certain circumstances, multitasking and parallel processing may be advantageous. Similarly, although some specific implementation details are included in the above discussion, these should not be interpreted as limiting the scope of the present disclosure. Some features described in the context of separate embodiments may also be implemented in combination in a single implementation. Conversely, the various features described in the context of a single implementation may also be implemented in a plurality of implementations individually or in any suitable sub-combination.

Although the subject matter has been described in language specific to structural features and/or method logical actions, it should be understood that the subject matter defined in the appended claims is not necessarily limited to the specific features or actions described above. On the contrary, the specific features and actions described above are merely exemplary forms of implementing the claims.

What is claimed is:

1. A computer-implemented method of training a model, comprising:
   calling a training preparation application programming interface (API) to set at least a loss function and an optimization function, in response to determining that a training preparation instruction is received, wherein the loss function and the optimization function are called to train the model;
   calling a training API to set a first data reading API, in response to determining that a training instruction is received, wherein the first data reading API is configured to load a training data set for training the model, wherein the training API comprises a call path for the loss function, a call path for the optimization function, and a call path for the first data reading API, to reuse low-level API codes of the loss function, low-level API codes of the optimization function and low-level API codes of the first data reading API;
   acquiring a number of a plurality of computing devices for parallel processing of the training data set;
   grouping the training data set based on the number, so that training data in the training data set is arranged in the first data reading API;
   determining a position in the first data reading API where the training data is missing;
   filling the position with predetermined data; and
   training the model based on the training data set from the first data reading API after the filling, by using the loss function and the optimization function through the training API, wherein the loss function is used for comparing a prediction result output by the model with a labeled result in the training data set so as to obtain a difference, the optimization function is used for optimizing parameters of the model, and the loss function and the optimization function are configured to perform the comparing and the optimizing repeatedly until the parameters of the model converge.

2. The method of claim 1, further comprising:
calling the training preparation API to set a measurement function;
calling an evaluation API to set a second data reading API, in response to determining that an evaluation instruction is received, wherein the second data reading API is configured to load an evaluation data set different from the training data set; and
evaluating the model based on the evaluation data set from the second data reading API, by using the model trained, the loss function and the measurement function through the evaluation API.

3. The method of claim 1, further comprising:
calling a prediction API to set a third data reading API, in response to determining that a prediction instruction is received, wherein the third data reading API is configured to load a prediction data set different from the training data set; and
determining a prediction result of the prediction data set from the third data reading API, by using the model trained through the prediction API.

4. The method of claim 2, further comprising:
acquiring a number of a plurality of computing devices for parallel processing of the evaluation data set;
grouping the evaluation data set based on the number, so that evaluation data in the evaluation data set is arranged in the second data reading API;
determining a position in the second data reading API where the evaluation data is missing; and
filling the position with predetermined data, so as to form a filled evaluation data set.

5. The method of claim 4, further comprising:
determining an evaluation result for the model based on the filled evaluation data set, by using the model trained, the loss function set and the measurement function set; and
minimizing a weight of an invalid evaluation result in the evaluation result, so as to remove the invalid evaluation result, wherein the invalid evaluation result is associated with the position where the evaluation data is missing.

6. The method of claim 2, wherein the evaluation API comprises a call path for the loss function, a call path for the measurement function, and a call path for the second data reading API.

7. A non-transitory computer-readable storage medium having a computer program stored thereon, wherein the computer program, when executed by a processor, causes the processor to implement the method of claim 1.

8. An electronic device, comprising:
one or more processors; and
a storage device for storing one or more programs, wherein the one or more programs, when executed by the one or more processors, cause the one or more processors to implement operations of training a model, comprising:
calling a training preparation application programming interface (API) to set at least a loss function and an optimization function, in response to determining that a training preparation instruction is received, wherein the loss function and the optimization function are called to train the model;
calling a training API to set a first data reading API, in response to determining that a training instruction is received, wherein the first data reading API is configured to load a training data set for training the model, wherein the training API comprises a call path for the loss function, a call path for the optimization function, and a call path for the first data reading API, to reuse low-level API codes of the loss function, low-level API codes of the optimization function and low-level API codes of the first data reading API;
acquiring a number of a plurality of computing devices for parallel processing of the training data set;
grouping the training data set based on the number, so that training data in the training data set is arranged in the first data reading API;
determining a position in the first data reading API where the training data is missing;
filling the position with predetermined data; and
training the model based on the training data set from the first data reading API after the filling, by using the loss function and the optimization function through the training API wherein the loss function is used for comparing a prediction result output by the model with a labeled result in the training data set so as to obtain a difference, the optimization function is used for optimizing parameters of the model, and the loss function and the optimization function are configured to perform the comparing and the optimizing repeatedly until the parameters of the model converge.

9. The electronic device of claim 8, wherein the one or more processors are further configured to implement operations of:
calling the training preparation API to set a measurement function;
calling an evaluation API to set a second data reading API, in response to determining that an evaluation instruction is received, wherein the second data reading API is configured to load an evaluation data set different from the training data set; and
evaluating the model based on the evaluation data set from the second data reading API, by using the model trained, the loss function and the measurement function through the evaluation API.

10. The electronic device of claim 8, wherein the one or more processors are further configured to implement operations of:
calling a prediction API to set a third data reading API, in response to determining that a prediction instruction is received, wherein the third data reading API is configured to load a prediction data set different from the training data set; and
determining a prediction result of the prediction data set from the third data reading API, by using the model trained through the prediction API.

11. The electronic device of claim 9, wherein the one or more processors are further configured to implement operations of:
acquiring a number of a plurality of computing devices for parallel processing of the evaluation data set;
grouping the evaluation data set based on the number, so that evaluation data in the evaluation data set is arranged in the second data reading API;
determining a position in the second data reading API where the evaluation data is missing; and
filling the position with predetermined data, so as to form a filled evaluation data set.

12. The electronic device of claim 11, wherein the one or more processors are further configured to implement operations of:

determining an evaluation result for the model based on the filled evaluation data set, by using the model trained, the loss function set and the measurement function set; and minimizing a weight of an invalid evaluation result in the evaluation result, so as to remove the invalid evaluation result, wherein the invalid evaluation result is associated with the position where the evaluation data is missing.

13. The electronic device of claim 9, wherein the evaluation API comprises a call path for the loss function, a call path for the measurement function, and a call path for the second data reading API.

\* \* \* \* \*